United States Patent
Lee

(10) Patent No.: US 6,842,465 B2
(45) Date of Patent: Jan. 11, 2005

(54) HARMONIC WAVE GENERATOR

(75) Inventor: Dong-ryeol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/097,144

(22) Filed: Mar. 14, 2002

(65) Prior Publication Data

US 2002/0191653 A1 Dec. 19, 2002

(30) Foreign Application Priority Data

Jun. 15, 2001 (KR) ........................................ 2001-33907

(51) Int. Cl.⁷ .............................................. H01S 3/10
(52) U.S. Cl. .......................................... 372/22; 372/23
(58) Field of Search ...................... 372/22, 23; 359/15, 359/19, 27

(56) References Cited

U.S. PATENT DOCUMENTS

| | | | | |
|---|---|---|---|---|
| 4,959,665 A | * | 9/1990 | Saito et al. ................. | 346/108 |
| 5,642,209 A | * | 6/1997 | Baker ........................... | 359/10 |
| 5,721,629 A | * | 2/1998 | Lee .............................. | 359/15 |
| 5,805,296 A | * | 9/1998 | Hattori ........................ | 358/300 |
| 5,854,870 A | * | 12/1998 | Helmfrid et al. ........... | 385/122 |
| 5,856,996 A | * | 1/1999 | Durkin et al. ................ | 372/98 |
| 5,892,614 A | * | 4/1999 | Asaba ......................... | 359/330 |
| 6,014,249 A | * | 1/2000 | Fermann et al. ............ | 359/341 |
| 6,393,038 B1 | * | 5/2002 | Raymond et al. ............. | 372/22 |
| 6,476,944 B1 | * | 11/2002 | La Russa ..................... | 359/15 |

FOREIGN PATENT DOCUMENTS

JP         2001284719 A    * 10/2001     ............. H01S/5/14

* cited by examiner

Primary Examiner—David Porta
Assistant Examiner—Davienne Monbleau
(74) Attorney, Agent, or Firm—Staas & Halsey LLP

(57) ABSTRACT

A harmonic wave generator including a light source to generate a fundamental wave having a predetermined wavelength, a non-linear material to transform at least a portion of the fundamental wave generated by the light source into a harmonic wave having a shorter wavelength than the fundamental wave, and a first optical device to separate the harmonic wave generated by the non-linear material from the fundamental wave. The harmonic wave generator further includes a second optical device between the condensing lens and the non-linear material to adjust the depth of the focus of light. The harmonic wave generator is easily assembled and can be manufactured at a low cost. A harmonic wave having high power can be generated.

14 Claims, 1 Drawing Sheet

HARMONIC WAVE GENERATOR

CROSS-REFERENCE TO RELATED APPLICATIONS

This application claims the benefit of Korean Patent Application No. 2001-33907 filed on Jun. 15, 2001, in the Korean Industrial Property Office, the disclosure of which is incorporated herein by reference.

BACKGROUND OF THE INVENTION

1. Field of the Invention

The present invention relates to a harmonic wave generator, and more particularly, to a harmonic wave generator using a non-linear material.

2. Description of the Related Art

It is possible to exchange energy among electromagnetic fields having different frequencies. One type of apparatus to which this phenomenon is applied is a harmonic generator. A second harmonic generating (SHG) apparatus which doubles the frequency of light using a non-linear material is the most representative.

An electrical dipole oscillates harmonically and an harmonically when the amplitude of light from the outside is large enough. From the analysis of the frequency component of the light wave, it is noticed that a light wave includes several kinds of harmonic waves as well as a fundamental wave. In general, if the crystal structure of a non-linear material has inverted symmetrical characteristics, the potentials of charges are symmetrical to one another. Thus, the lowest non-linear polarization in which dipoles are combined is a third harmonic. A second harmonic component of non-linearly polarized light exists in a non-linear material having no inverted symmetrical characteristics. Also, a process of emitting light by a polarization oscillating with a double frequency is called a second harmonic generation.

As the high density of optical recording media and high precision of laser printers increase, a light source having a short wavelength and high power is increasingly required. Laser diodes to emit light of a blue wavelength, which is a conventional short wavelength, have been developed at a high price. Thus, it is now difficult to commonly use the laser diodes in the reproduction of the optical recording media and the laser printers.

Light having a short wavelength and high power may be obtained from an SHG apparatus. However, a conventional half-wavelength generator, which can reduce the wavelength of light by half using the SHG apparatus includes a solid laser which emits light having a wavelength of 1064 nm or 946 nm as a light source. Light emitted from the solid laser as described above is converted into light having half the original wavelength, i.e., a wavelength of 546 nm or 473 nm, by a material to generate a second harmonic wave.

Accordingly, the conventional half-wavelength generator is high-priced and has many optical parts. Thus, the conventional half-wavelength generator is bulky and is not easy to assemble. As a result, the conventional half-wavelength generator is not suitable to reproduce data from optical recording media of high density and devices requiring small-sized lasers having high power.

SUMMARY OF THE INVENTION

Accordingly, it is an object of the present invention to provide a small-sized harmonic generator which is low-priced and easy to manufacture and can generate a laser having high power.

Additional objects and advantages of the invention will be set forth in part in the description which follows and, in part, will be obvious from the description, or may be learned by practice of the invention.

The foregoing and other objects of the present invention are achieved by providing a harmonic wave generator. The harmonic wave generator includes a light source to generate a fundamental wave having a predetermined wavelength, a non-linear material to transform at least a portion of the fundamental wave generated by the light source into a harmonic wave having a shorter wavelength than the fundamental wave, and a first optical device to separate the harmonic wave generated by the non-linear material from the fundamental wave.

The light source can be a laser diode. The non-linear material is preferably periodically poled $LiNbO_3$ (PPLN) as a material to generate a second harmonic wave.

The first optical device can be a hologram which diffracts the fundamental wave into first-order diffractions, and diffracts the harmonic wave into zeroth-order diffraction.

A condensing lens is further included between the light source and the non-linear material to condense light generated by the light source.

A second optical device is further included between the condensing lens and the non-linear material to adjust the depth of the focus of light. The second optical device is preferably a hologram.

The harmonic wave generator uses a light source such as a laser diode and further uses holograms which results in low manufacturing costs and generation of a harmonic wave having high power.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
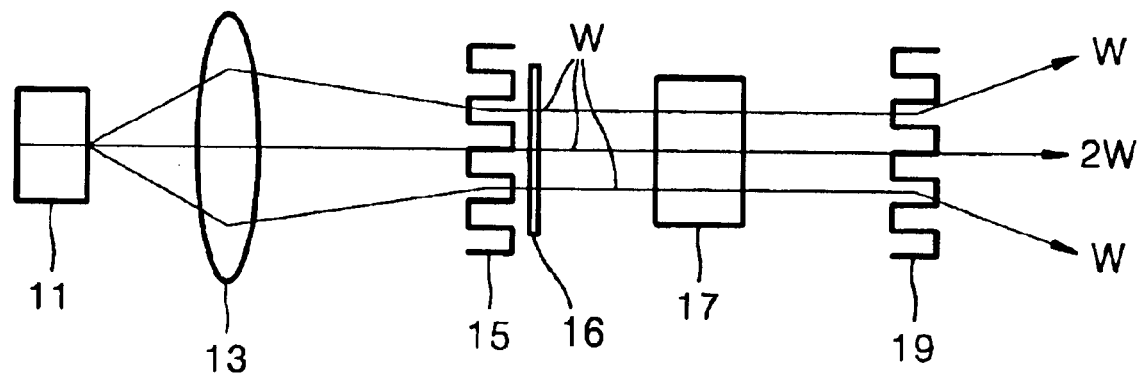
FIG. 1 illustrates a harmonic generator according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Hereinafter, a harmonic generator according to an embodiment of the present invention will be described with reference to the attached FIG. 1. Referring to FIG. 1, the harmonic generator includes a light source 11, a non-linear material 17, and a first optical device 19. The light source 11 generates a fundamental wave having a predetermined wavelength. The non-linear material 17 transforms a portion of the light generated by the light source 11 into a harmonic wave having a shorter wavelength than the fundamental wave. The first optical device 19 separates the optical paths of fundamental and harmonic waves depending on their wavelengths.

An embodiment of the present invention provides that the light source 11 includes a laser diode which outputs a laser beam having a wavelength of 780 nm. Here, the light source 11 may include a semiconductor laser diode which outputs light having a wavelength of over 800 nm.

The light source 11 outputs a continuous wave if the harmonic generator according to the present invention is used as a light source having high power in an optical pickup device or the like. The light source 11 outputs a pulse-type wave if the harmonic generator is used as a light source in medical instruments.

The direction of the polarized light of the non-linear material 17 is important for the phase matching of a harmonic wave. Thus, the harmonic wave generator of the present invention may further include an optical device 16 that passes only a linearly polarized light component of the light emitted from the light source 11 or converts the light emitted from the light source 11 into linearly polarized light. The linearly polarized light must be incident parallel to the optical axis of the non-linear material 17. Here, the optical axis represents a direction toward the place where a normal refractive index and an abnormal refractive index meet in a double refraction material. The harmonic wave amplitude is at the maximum if they are in phase.

The non-linear material 17 converts a portion of the fundamental wave generated by the light source 11 into a harmonic wave, preferably a second harmonic wave, having a shorter wavelength than the fundamental wave. Here, if the fundamental frequency of the fundamental wave is W, a second harmonic wave of the harmonic wave has a frequency of 2W, and a third harmonic wave of the harmonic wave has a frequency of 3W. If the main object of the harmonic wave generator according to the present invention is to generate the second harmonic wave, the harmonic wave generator preferably includes a material having strong second non-linear characteristics as the non-linear material 17. The material having the second non-linear characteristics includes KDP, BBO, LBO, KTP, $LiNbO_3$, or PPLN. It is preferable that the harmonic wave generator according to the present invention includes PPLN, which has a large optical coefficient of about 20 pm/V, as the non-linear material 17. If PPLN is used as the non-linear material 17, a near-infrared light as a fundamental wave of a 100 mW semiconductor laser diode is the second harmonic wave generated to obtain a blue laser light of several mW as a harmonic wave.

The first optical device 19 separates the light penetrating the non-linear material 17 into the fundamental wave and the harmonic wave having a shorter wavelength than the fundamental wave. If the harmonic wave is a second harmonic wave, the second harmonic wave is reproduced as 0th-order light, and the fundamental wave is reproduced as $+1^{st}$-order and/or $-1^{st}$-order light. An embodiment of the present invention provides that the first optical device 19 is a hologram.

In an embodiment of the present invention, a condensing lens 13 is further included between the light source 11 and the non-linear material 17. The condensing lens 13 condenses the light emitted from the light source 11. The condensing lens 13 compensates for the insufficient strength of light when the harmonic wave is generated as a harmonic wave. The strength of the second harmonic wave is proportional to the product of a second non-linear coefficient and the strength of incident light. Thus, the condensing lens 13 increases the strength of light to increase the strength of the second harmonic wave if a non-linear material having a low second non-linear coefficient is used when the harmonic wave is a second harmonic wave.

In an embodiment of the present invention, a second optical device 15 is further included between the condensing lens 13 and the non-linear material 17. The second optical device 15 may be a hologram. The second optical device 15 changes the depth of the focus of light passing through the condensing lens 13. The second optical device 15 is disposed in a proper position between the condensing lens 13 and the non-linear material 17 to adjust the depth of the focus. Since the diameter of the light incident on the non-linear material 17 is uniform, the depth of the focus is adjusted to change the distance between the second optical device 15 and the non-linear material 17.

When the condensing lens 13 and the second optical device 15 are further included, the fundamental wave emitted from the light source 11 can be efficiently condensed, and light incident on the non-linear material 17 can be converted into parallel light to reduce the loss of light intensity.

As described above, a harmonic wave generator according to the present invention can change the wavelength of a light wave. Thus, the harmonic wave generator can be adapted in optical pickups, laser printers, light measuring devices, or other devices that need to change the wavelength of light.

The harmonic wave generator according to an embodiment of the present invention uses holograms. Thus, an optical device is easily assembled and can be manufactured at a low cost. Since a laser diode which emits light having a specific wavelength is used as a light source, a harmonic wave having high power can be generated.

As described above, the harmonic wave generator according to the present invention is capable of being manufactured as a small-sized harmonic generator having high power and using a light source such as a laser diode. Also, the harmonic wave generator further includes holograms as first and second optical devices which results in low manufacturing costs. Moreover, the harmonic wave generator may further include a second optical device to adjust the depth of focus to increase the intensity of light.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A harmonic wave generator comprising:
   a light source to generate a fundamental wave having a predetermined wavelength;
   a condensing lens to focus the fundamental wave generated by the light source;
   a non-linear material to transform at least a portion of the fundamental wave generated by said light source into a harmonic wave having a shorter wavelength than the fundamental wave;
   a first optical diffracting device to separate the harmonic wave generated by said non-linear material from the fundamental wave; and
   a second optical device between the condensing lens and the non-linear material to adjust depth of focus of the fundamental wave generated by the light source.

2. The harmonic wave generator according to claim 1, wherein said light source is a laser diode.

3. The harmonic wave generator according to claim 1, wherein said non-linear material is a material to generate a second harmonic wave.

4. The harmonic wave generator according to claim 3, wherein said non-linear material is PPLN.

5. The harmonic wave generator according to claim 3, wherein said non-linear material includes one of KDP, BBO, LBO, KTP, or $LiNbO_3$.

6. The harmonic wave generator according to claim 1, wherein said first optical device is a hologram.

7. The harmonic wave generator according to claim 6, wherein said first optical device diffracts the fundamental wave into first-order diffractions and diffracts the harmonic wave into zeroth-order diffraction.

8. The harmonic wave generator according to claim 1, wherein said second optical device is a hologram.

9. The harmonic wave generator according to claim 1, further comprising a third optical device to pass only a linearly polarized light component of the light emitted from said light source.

10. The harmonic wave generator according to claim 1, further comprising a third optical device to convert the light emitted from said light source into linearly polarized light.

11. The harmonic wave generator according to claim 1, wherein said light source outputs a continuous wave.

12. The harmonic wave generator according to claim 1, wherein said light source outputs a pulse-type wave.

13. The harmonic wave generator according to claim 1, wherein said predetermined wavelength is 780 nm.

14. The harmonic wave generator according to claim 1, wherein said predetermined wavelength is greater than 800 nm.

* * * * *